(12) United States Patent
Takeo et al.

(10) Patent No.: US 9,171,558 B2
(45) Date of Patent: Oct. 27, 2015

(54) MAGNETIC HEAD WITH MULTIPLE REPRODUCING ELEMENTS EACH HAVING MAGNETICALLY COUPLED FREE LAYERS, MAGNETIC RECORDING REPRODUCING APPARATUS AND MAGNETIC HEAD MANUFACTURING METHOD

(71) Applicant: KABUSHIKI KAISHA TOSHIBA, Tokyo (JP)

(72) Inventors: Akihiko Takeo, Tokyo (JP); Kazuto Kashiwagi, Kanagawa (JP); Kenichiro Yamada, Tokyo (JP); Katsuhiko Koui, Kanagawa (JP); Tomomi Funayama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/152,974

(22) Filed: Jan. 10, 2014

(65) Prior Publication Data

US 2014/0376130 A1    Dec. 25, 2014

(30) Foreign Application Priority Data

Jun. 21, 2013    (JP) .................................. 2013-130909

(51) Int. Cl.
*G11B 5/39* (2006.01)
*G11B 5/31* (2006.01)
*G11B 5/29* (2006.01)
(Continued)

(52) U.S. Cl.
CPC ................ *G11B 5/3163* (2013.01); *G11B 5/29* (2013.01); *G11B 5/3909* (2013.01); *G11B 5/3912* (2013.01); *G11B 5/3932* (2013.01);
(Continued)

(58) Field of Classification Search
CPC ...... G11B 5/39; G11B 5/3903; G11B 5/3909; G11B 5/3912; G11B 5/3929; G11B 5/3932; G11B 5/3945; G11B 5/3948; G11B 5/3958
USPC ........... 360/314, 315, 324.1, 324.11, 324.12, 360/324.2, 316
See application file for complete search history.

(56) References Cited

U.S. PATENT DOCUMENTS 5,842,269 A * 12/1998 Albertini et al. ........... 29/603.13
6,308,400 B1 * 10/2001 Liao et al. .................. 29/603.14
(Continued)

OTHER PUBLICATIONS

Yamashita et al., "Modeling of Writing Process for Two-Dimensional Magnetic Recording and Performance Evaluation of Two-Dimensional Neural Network Equalizer", IEEE Transactions on Magnetics, vol. 48, No. 11, Nov. 12, 4 pages.

(Continued)

*Primary Examiner* — Jefferson Evans
(74) *Attorney, Agent, or Firm* — Patterson & Sheridan, LLP (57) ABSTRACT

A magnetic head includes a plurality of reproducing elements so that the magnetic head can acquire reproduction signals from a plurality of tracks at the same time. The magnetic head includes a first reproducing element, a first magnetic film formed on a first side wall of the first reproducing element with a first side wall insulating film interposed therebetween, a second magnetic film formed on a second side wall of the first reproducing element with a second side wall insulating film interposed therebetween, a second reproducing element electrically isolated from the first reproducing element and formed on the first magnetic film, a third magnetic film formed on the first magnetic film, and a fourth magnetic film formed on the first reproducing element and electrically isolated from the second reproducing element.

9 Claims, 6 Drawing Sheets

(51) Int. Cl.
  *G11B 5/48* (2006.01)
  *G11B 5/49* (2006.01)
(52) U.S. Cl.
  CPC ............ *G11B5/3958* (2013.01); *G11B 5/4886* (2013.01); *G11B 5/4976* (2013.01)

(56) References Cited

U.S. PATENT DOCUMENTS

| | | | |
|---|---|---|---|
| 7,079,359 B1 * | 7/2006 | He et al. | 360/314 |
| 7,126,890 B2 | 10/2006 | Learned et al. | |
| 7,342,748 B2 * | 3/2008 | Yip et al. | 360/241.1 |
| 7,405,907 B2 | 7/2008 | Raastad | |
| 7,755,863 B2 | 7/2010 | Neumann et al. | |
| 7,898,775 B2 * | 3/2011 | Hirata et al. | 360/324.12 |
| 8,786,987 B2 * | 7/2014 | Edelman et al. | 360/324.12 |
| 2004/0021982 A1 * | 2/2004 | Ozue et al. | 360/121 |
| 2005/0259358 A1 * | 11/2005 | Ozue | 360/129 |
| 2006/0028772 A1 * | 2/2006 | Raastad | 360/315 |
| 2007/0019335 A1 * | 1/2007 | McFadyen | 360/316 |
| 2011/0069413 A1 * | 3/2011 | Maat et al. | 360/234.3 |

OTHER PUBLICATIONS

Mathew et al., "Capacity Advantage of Array-Reader Based Magnetic Recording for Next Generation Hard Disk Drives", Intermag/MMM 2013, TMRC 2013 abstract, 2 pages.

* cited by examiner

MAGNETIC HEAD WITH MULTIPLE REPRODUCING ELEMENTS EACH HAVING MAGNETICALLY COUPLED FREE LAYERS, MAGNETIC RECORDING REPRODUCING APPARATUS AND MAGNETIC HEAD MANUFACTURING METHOD

CROSS-REFERENCE TO RELATED APPLICATIONS

This application is based upon and claims the benefit of priority from Japanese Patent Application No. 2013-130909, filed Jun. 21, 2013, the entire contents of which are incorporated herein by reference.

FIELD

Embodiments relate generally to a magnetic head, a magnetic recording and reproducing apparatus and a magnetic head manufacturing method.

BACKGROUND

Hard disk drives (HDDs) are now being widely used as large-capacity recording apparatuses in a variety of applications, because of their low cost per bit, such as for video recorders, network-attached storage (NAS), file servers, etc. In the current information-oriented society where information items are generated every day, there has been an increasing demand for higher capacity and density HDDs for storing the information. As one of the techniques for enhancing the density of HDDs, there exists a technique called an inter-track interference (ITI) cancelling technique or a two dimensional magnetic recording (TDMR) technique. This technique utilizes not only reproduction signal from a target track, but also reproduction signal from a track adjacent to the target track so as to cancel track noise from the adjacent signal contained in the target track in order to enhance the decoding accuracy of the recording/reproducing signal from the target track.

In order to acquire reproduction signals from a plurality of tracks, a reproducing head having a plurality of reproducing elements has been proposed.

The structure of the reproducing head having a plurality of reproducing elements includes a pair of reproduction shields for each of the reproducing elements to isolate signal detection paths for guiding currents to the reproducing elements. In this structure, however, it is necessary to provide a sufficient distance, known as traveling-directional distance Gd, between the reproducing elements. If the traveling-directional distance Gd is long, a change in an inter-element distance Rp along the track width will increase even when the skew angle changes only slightly. As a result, the inter-track interference amount of a reproduction signal will significantly differ between different radial positions at which reproduction is performed.

BRIEF DESCRIPTION OF THE DRAWINGS

A general architecture that implements the various features of an embodiment will now be described with reference to the drawings. The drawings and the associated descriptions are provided to illustrate the embodiment and not to limit the scope of the invention.

DETAILED DESCRIPTION

One embodiment will be described hereinafter with reference to the accompanying drawings.

Figure 1:
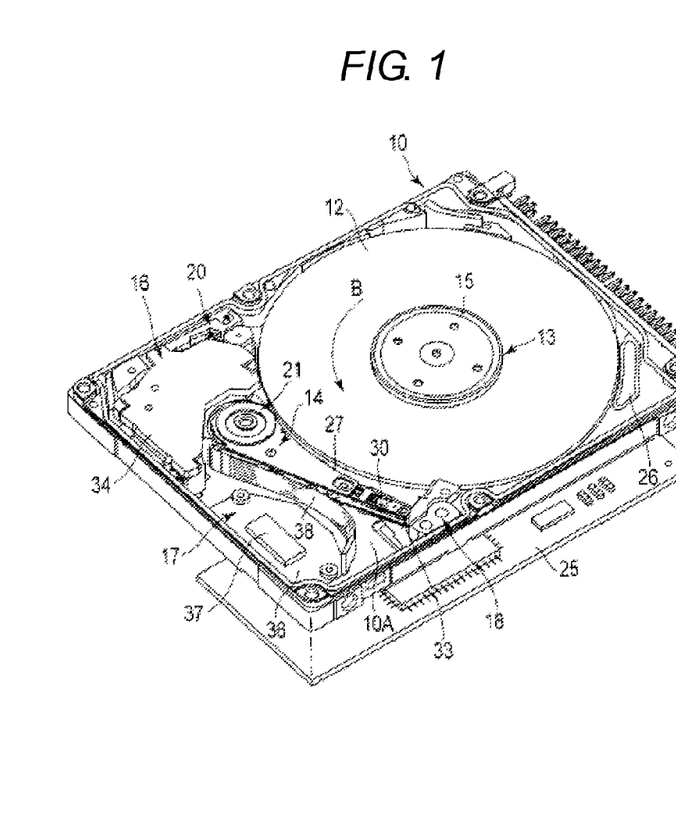
FIG. 1 is a perspective view illustrating an example of a structure of a magnetic recording/reproducing apparatus according to an embodiment.
Figure 2:
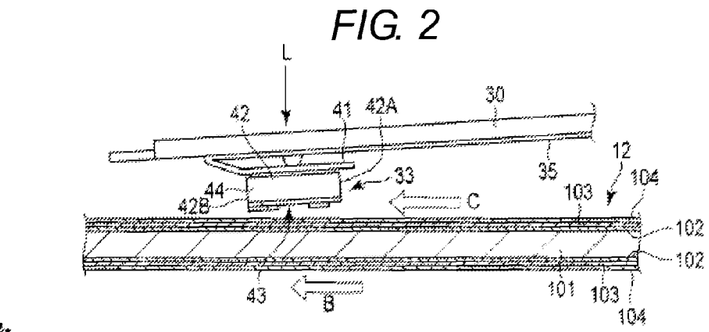
FIG. 2 is a side view illustrating examples of a magnetic head and a suspension employed in the embodiment.

Referring first to FIGS. 1 and 2, the structure of a magnetic recording/reproducing apparatus according to the embodiment will be described. This magnetic recording/reproducing apparatus can be realized as a hard disk drive (HDD).

FIG. 1 shows the internal structure of the HDD of the embodiment viewed when its top cover is removed, and FIG. 2 shows a magnetic head in a floating state.

As shown in FIG. 1, the HDD has a housing 10. The housing 10 comprises a rectangular box-shaped base 10A with an open top, and a rectangular plate-shaped top cover (not shown). The top cover is secured to the base 10A by a plurality of screws to cover the open top of the base 10A. Thus, the inside of the housing 10 is kept air-tight, and communicates with the outside only through a breathing filter 26.

A magnetic disk 12 as a recording medium and a mechanical unit are provided on the base 10A. The mechanical unit comprises a spindle motor 13 supporting the magnetic disk 12 such that the magnetic disk is rotatable, a plurality of (e.g., two) magnetic heads 33 for recording and reproducing data on and from the magnetic disk, a head actuator 14 supporting the magnetic heads 33 such that they are movable relative to the surface of the magnetic disk 12, and a voice coil motor (hereinafter, the VCM) 16 for angularly moving and positioning the head actuator. On the base 10A, there are also provided a ramp load mechanism 18 for holding the magnetic head 33 at a position apart from the magnetic disk 12 when the magnetic heads 33 are shifted to the outermost peripheral portion of the magnetic disk 12, a latch mechanism 20 for holding the head actuator 14 at a retracted position when the HDD receives, for example, an impact, and a board unit 17 provided with electronic devices such as a pre-amplifier and a head IC.

A control circuit board 25 is screwed to the outer surface (i.e., the bottom wall) of the base 10A. The control circuit board 25 controls the spindle motor 13, the VCM 16 and magnetic heads 33 via the board unit 17.

As shown in FIG. 1, the magnetic disk 12 is clamped by a clamp spring 15 fitted on the hub of the spindle motor 13 coaxially with the disk and screwed to the upper end of the hub, whereby it is secured to the hub. The magnetic disk 12 is rotated by the spindle motor 13 as a driving motor at a predetermined speed in the direction indicated by arrow B.

The head actuator 14 comprises a bearing portion 21 fixed on the bottom of the base 10A, and a plurality of arms 27 extended from the bearing portion 21. The arms 27 are placed at predetermined intervals therebetween in parallel with the surfaces of the magnetic disk 12, and are extended in the same direction from the bearing portion 21. The head actuator 14 includes elastically deformable elongated plate-shaped suspensions 30. The suspensions 30 are each constituted of a leaf spring, and their respective proximal ends are fixed to ends of the arms 27 by spot welding or bonding such that the suspensions are extended therefrom. Alternatively, each suspension 30 may be formed integral with the corresponding arm 27 as one body. The magnetic heads 33 are supported at the extended ends of the respective suspensions 30. The arms 27 and suspensions 30 constitute a head suspension, and the head suspension and the magnetic heads 33 constitute a head suspension assembly.

As shown in FIG. 2, each magnetic head 33 has a slider 42 formed into a substantially rectangular parallelepiped shape, and a recording/reproducing head portion 44 provided at the outflow end (trailing end) of the slider. The magnetic heads 33 are fixed to gimbal springs 41 provided at the distal ends of the suspensions 30. A head load L directed toward the surfaces of the magnetic disk 12 is applied to each magnetic head 33 by elasticity of the corresponding suspension 30. The two arms 27 are placed in parallel at a predetermined interval therebetween, and the suspensions 30 and the magnetic heads 33 attached to the arms 27 face the counterparts, with the magnetic disk 12 held therebetween.

Each magnetic head 33 is electrically connected to a later-described main flexible printed circuit board (hereinafter referred to as a main FPC) 38 through a relay flexible printed circuit board (hereinafter, a relay FPC) 35 fixed on the corresponding suspension 30 and arm 27.

As shown in FIG. 1, the board unit 17 has an FPC main body 36 formed of a flexible printed circuit board and the main FPC 38 extended from this FPC main body. The FPC main body 36 is fixed on the bottom surface of the base 10A. Electronic components including a conversion connector 37 and a head IC are mounted on the FPC main body 36. The extended end of the main FPC 38 is connected to the head actuator 14, and connected to the magnetic head 33 through each relay FPC 35.

The VCM 16 has a support frame (not shown) extended from the bearing portion 21 in the opposite direction of the arm 27, and a voice coil (not shown) supported by the support frame. Where the head actuator 14 is attached to the base 10A, the voice coil is placed between a pair of yokes 34 fixed on the base 10A, and the voice coil, the yokes, and magnets fixed to the yokes constitute the VCM 16.

When the magnetic disk 12 is rotated and the voice coil of the VCM 16 is activated, the head actuator 14 angularly moves to thereby position the magnetic head 33 on a desired track on the magnetic disk 12. At this time, the magnetic head 33 is radially moved between an inner peripheral portion and an outer peripheral portion of the magnetic disk 12.

The head portion 44 comprises a reproducing head and a recording head (magnetic recording head) formed at the trailing end 42B of the slider 42 by a thin-film forming process.

The head portion 44 is formed as a magnetic head including the reproducing head and the recording head separate from each other.

Figure 3:
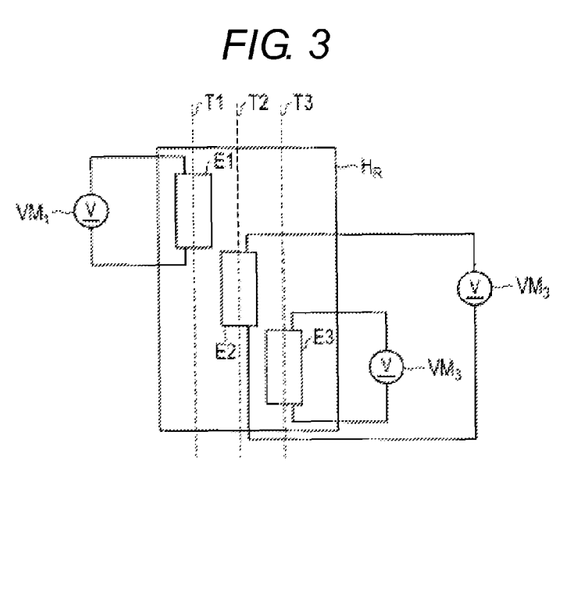
FIG. 3 is a schematic view illustrating an example of a structure of a reproducing head employed in the embodiment.

The reproducing head comprises a plurality of reproducing elements and can simultaneously reproduce a signal from a target track and a signal from each track adjacent to the target track. For instance, as shown in FIG. 3, a reproducing head $H_R$ comprises three reproducing elements E1, E2 and E3 and can simultaneously read signals from a target track T2 and two tracks T1 and T3 adjacent thereto. Further, to read changes in the magnetic resistances of the reproducing elements E1, E2 and E3, the HDD comprises voltage meters $VM_1$, $VM_2$ and $VM_3$ corresponding to the reproducing elements E1, E2 and E3, respectively.

Figure 4:
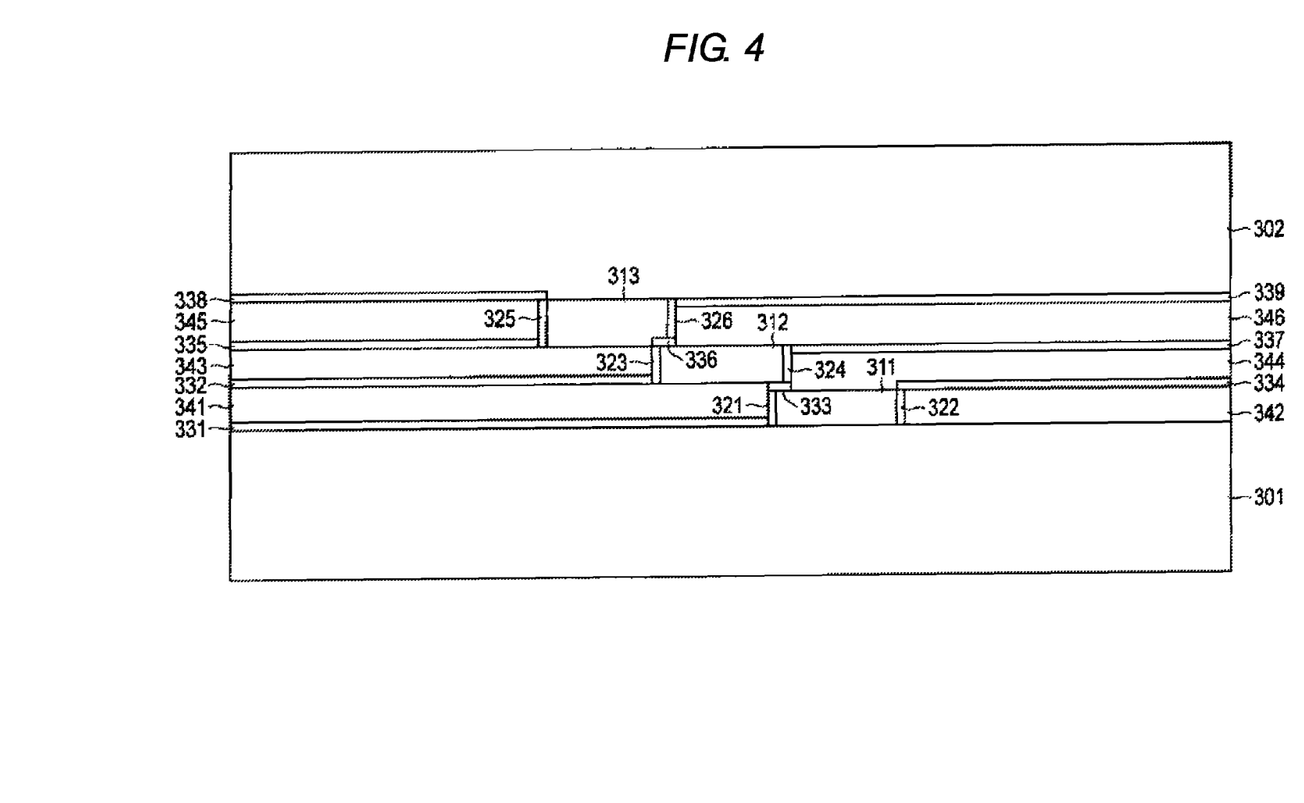
FIG. 4 is a view illustrating an example of a structure of the reproducing head employed in the embodiment.

FIG. 4 is a view illustrating the structure of the reproducing head, in particular of the air bearing surface (ABS) of the reproducing head (=the surface the reproducing head opposing the surface of the magnetic disk).

As shown, a first reproducing element 311 is provided on a first magnetic shield 301. A first sidewall insulating film 321 and a second sidewall insulating film 322 are formed on the opposite side surfaces of the first reproducing element 311. The first and second sidewall insulating films 321 and 322 are connected to the first magnetic shield 301. A first insulating film 331 is connected to the first sidewall insulating film 321. A first magnetic thin film 341 for shielding or biasing is formed on the first insulating film 331. The first magnetic thin film 341 is provided on a side surface of the first reproducing element 311 with the first sidewall insulating film 321 interposed therebetween. A second magnetic thin film 342 for shielding or biasing is formed on the first magnetic shield 301. The second magnetic thin film 342 is provided on the other side surface of the first reproducing element 311 with the second sidewall insulating film 322 interposed therebetween.

A second insulating film 332 is formed on the first magnetic thin film 341. A third insulating film 333 is formed on the first sidewall insulating film 321 and on part of the upper surface of the first reproducing element 311. The first magnetic thin film 341 is exposed between the second and third insulating films 332 and 333. A fourth insulating film 334 is formed on the second sidewall insulating film 322 and on the second magnetic thin film 342. The first reproducing element 311 is exposed between the third and fourth insulating films 333 and 334.

A second reproducing element 312 is formed on the part of the first magnetic thin film 341 that is located between the second and third insulating films 332 and 333, and on part of the third insulating film 333. A third sidewall insulating film 323 and a fourth sidewall insulating film 324 are formed on the opposite side surfaces of the second reproducing element 312. A third magnetic thin film 343 is formed on the second insulting film 332. The third magnetic thin film 343 is formed on a side surface of the second reproducing element 312 with the third sidewall insulating film 323 interposed therebetween.

A fourth magnetic thin film 344 for shielding or biasing is formed on the part of the first reproducing element 311 that is located between the third and fourth insulating films 333 and 334, and on the fourth insulating film 334. The fourth magnetic thin film 344 is formed on the other side surface of the second reproducing element 312 with the fourth sidewall insulating film 324 interposed therebetween.

A fifth insulating film 335 is formed on the third magnetic thin film 343. A sixth insulating film 336 is formed on the third sidewall insulating film 323 and on part of the upper surface of the second reproducing element 312. The third magnetic thin film 343 is exposed between the fifth and sixth insulating films 335 and 336. A seventh insulating film 337 is formed on the fourth magnetic thin film 344. The second reproducing element 312 is exposed between the sixth and seventh insulating films 336 and 337.

A third reproducing element 313 is formed on the part of the third magnetic thin film 343 that is located between the fifth and sixth insulating films 335 and 336, and on part of the sixth insulating film 336. The fifth and sixth sidewall insulating films 325 and 326 are formed on the opposite side surfaces of the third reproducing element 313. A fifth magnetic thin film 345 is formed on the fifth insulating film 335. The fifth magnetic thin film 345 is formed on a side surface of the third reproducing element 313 with the fifth sidewall insulating film 325 interposed therebetween.

An eighth insulating film 338 is formed on the fifth magnetic thin film 345 and on the fifth sidewall insulating film 325. A sixth magnetic thin film 346 for shielding or biasing is formed on the part of the second reproducing element 312 that is located between the sixth and seventh insulating films 336 and 337, and on the seventh insulating film 337. The sixth magnetic thin film 346 is formed on the other side surface of the third reproducing element 313 with the sixth sidewall insulating film 326 interposed therebetween. A ninth insulating film 339 is formed on the sixth magnetic thin film 346. A second magnetic shield 302 is formed on the eighth and ninth insulating films 338 and 339 and the third reproducing element 313.

The structure shown in FIG. 4 will now be described in a way different from the above.

The reproducing head comprises a plurality of reproducing elements 311, 312 and 313 provided in an area sandwiched by a pair of magnetic shields. The first reproducing element 311 is electrically connected to a first magnetic shield 301. The reproducing head further comprises first and second magnetic thin films 341 and 342 for shielding or biasing, which are formed on the opposite sides of the first reproducing element 311 and are electrically isolated from the first magnetic shield 311.

On the first magnetic thin film 341, the second reproducing element 312 is provided. The second reproducing element 312 is electrically connected to the first magnetic thin film 341 and is electrically isolated from the first reproducing element 311. On the opposite sides of the second reproducing element 312, third and fourth magnetic thin films 343 and 344 for shielding or biasing are provided, electrically isolated from the reproducing element 312. The third and fourth magnetic thin films 343 and 344 for shielding or biasing are formed of a soft magnetic material or a hard magnetic material of a relatively low coercive force (e.g., 1 kOe or less, which is weaker than a magnetic field intensity signal from a medium). The fourth magnetic thin film 344 is electrically connected to the first reproducing element 311. Further, the third reproducing element 313 is provided on the third magnetic thin film 343, electrically connected thereto. Firth and sixth magnetic thin films 345 and 346 for shielding or biasing are provided on the opposite sides of the third reproducing element 313, electrically isolated therefrom. The third reproducing element 313 is electrically connected to the second magnetic shield 302, and the second reproducing element 312 is electrically connected to the sixth magnetic thin film 346. The paths of currents flowing through the reproducing elements are independent of each other and electrically isolated from each other.

In the above structure, the first magnetic shield 301 and the fourth magnetic thin film 344 serve as a pair of shields for enhancing reproduction resolution of the first reproducing element 311, and cooperate to serve as a current path for detecting a change in the resistance of the first reproducing element 311 due to a signal from a medium.

Similarly, the first and sixth magnetic thin films 341 and 346 serve as a pair of shields and cooperate to serve as an element resistance change detection current path for the second reproducing element 312. The third and fourth magnetic thin films 343 and 344 also have a biasing function for the second reproducing element 312. Namely, the fourth magnetic thin film 344 simultaneously serves as a magnetic shield and a conductor for the first reproducing element 311, and as a biasing film for the second reproducing element 312.

Yet further, the third magnetic thin film 343 and the second magnetic shield 302 serve as a pair of shields and cooperate to serve as an element resistance change detection current path for the third reproducing element 313. The third magnetic thin film 343 simultaneously serves as a magnetic shield for the third reproducing element 313, and as a biasing film for the second reproducing element 312.

In the above structure, the distance Gd between the reproducing elements in the traveling direction of the reproducing head is substantially equal to the insulating thin film thickness, and can be set to be no greater than several nanometers. Since the distance Gd between the reproducing elements is thus small, the change $\Delta Rp$ in the distance Rp between the reproducing elements along the track width will change by a small amount regardless of a change in skew angle. As a result, the inter-track interference of reproducing signals does not significantly differ between different radial positions on a disk from which data is reproduced.

The above-described embodiment employs three reproducing elements. However, it is obvious that when two reproducing elements are employed, a structure similar to the above can be realized by omitting the structure of the second reproducing element 312 in FIG. 4, and when four or more reproducing elements are employed, a similar structure can be realized by stacking a structure similar to that of the second reproducing element 312.

In the above-described embodiment, a reproducing signal is decoded based on a plurality of interference reproducing signals, by combining a target reproducing signal and delay signals reproduced from other reproducing elements. This enables signal reproduction at a high track density. When the magnetic head of the embodiment, wherein the traveling directional distance Gd between reproducing elements is significantly shorter than in a comparative example representing the prior art structure, is used, the delay occurring when signals from adjacent reproducing elements are combined can also be significantly reduced, and therefore the delay circuit used in real-time signal processing can be significantly simplified.

(Structure of Reproducing Element)

Figure 5:
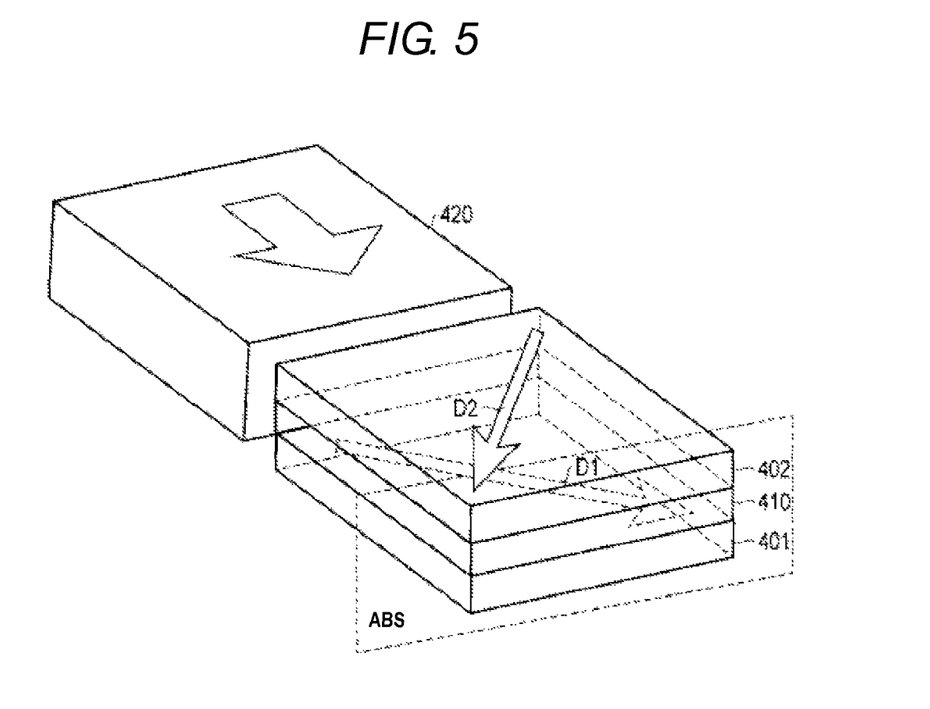
FIG. 5 is a view illustrating an example of a structure of the reproducing element shown in FIG. 4.

A description will be given of an example of a structure of a reproducing element. As the reproducing element used in the embodiment, a spin valve type TMR head, for example, which is employed in a general HDD, may be used. However, it is more preferable to use a longitudinal-bias type tri-layer structure head that requires no bias structure on a reproducing element side. FIG. 5 shows an example of a structure of a reproducing element having a tri-layer structure, As shown in FIG. 5, there are provided two magnetization free layers 401 and 402, and a non-magnetic metal thin film 410 interposed therebetween. A magnetized bias film 420 is provided behind the magnetization free layers 401 and 402 with respect to the ABS surface.

The magnetized bias film 420 causes the magnetization direction D1 of the magnetization free layer 401 to intersect the magnetization direction D2 of the magnetization free layer 402. When the external magnetic field of a medium is applied, the angle between the magnetization directions of the magnetization free layers 401 and 402 varies to thereby vary the magnetic resistance of the reproducing element. In this reproducing element structure, since no bias film is necessary on the side surface of the reproducing element, the first to sixth magnetic thin films shown in FIG. 4 can be made as simple soft magnetic shield thin films. Since it is not necessary to impart a biasing function to any of the first to sixth magnetic thin films, the embodiment can provide a magnetic head capable of guaranteeing reliable reproducing element operation regardless of variations in the magnetic characteristics of the first to sixth magnetic thin films.

(Example Employing Two Reproducing Elements)

Figure 6:
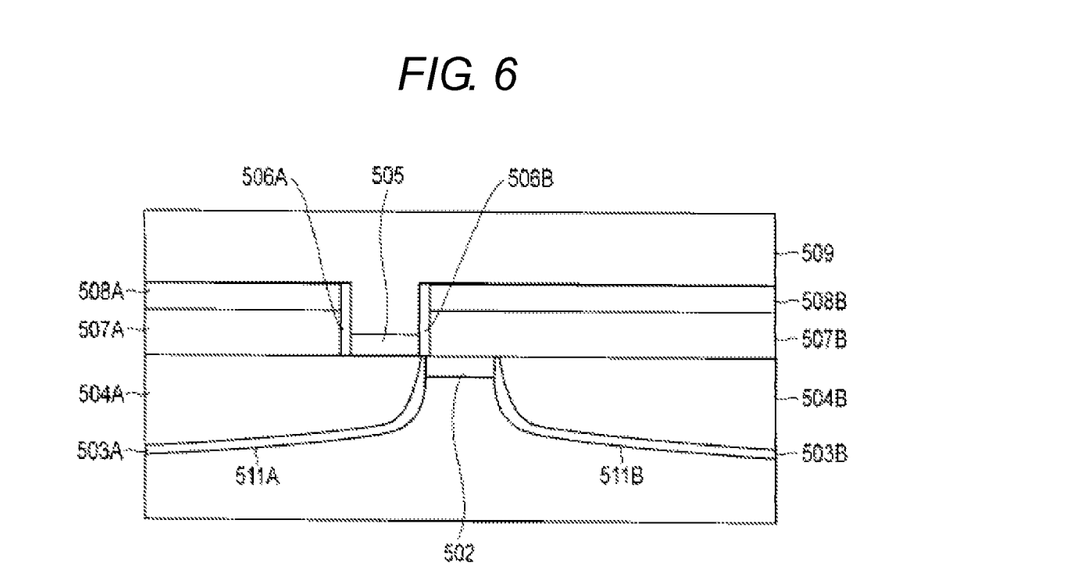
FIG. 6 is a view illustrating an example of a structure of the reproducing head employed in the embodiment.

Referring then to FIG. 6, a description will be given of a head structure example in which the number of reproducing elements in one head is limited to two, and a brief description be given of a manufacturing method of this structure.

A first reproducing element 502 is formed on a first magnetic shield 501. Those portions of the first magnetic shield 501 that are located on the opposite side surfaces of the first reproducing element 502 are deeply cut in the form of recesses 511A and 511B after a reproducing element film is formed. A first magnetic thin film 504A is formed on the bottom of the recess 511A with a first insulating layer 503A interposed therebetween. Similarly, a second magnetic thin film 504B is formed on the bottom of the recess 511B with a second insulating layer 503B interposed therebetween. The upper surfaces of the first reproducing element 502, the first insulating layer 503A, the second insulating layer 503B, the first magnetic thin film 504A and the second magnetic thin film 504B are at substantially the same level.

A second reproducing element 505 is formed on the portion of the first magnetic thin film 504A that is offset from the first reproducing element 502 along the track width. Insulating layers 506A and 506B are formed on the side surfaces of the second reproducing element 505. A third magnetic thin film 507A is formed on the first magnetic thin film 504A. A fourth magnetic thin film 507B is formed on the second magnetic thin film 504B. The first magnetic thin film 504A is electrically connected to the third magnetic thin film 507A, and the second magnetic thin film 504B is electrically connected to the fourth magnetic thin film 507B. Insulating layers 508A, 508B are formed respectively on the third and fourth magnetic thin films 507A and 507B. A second magnetic shield 509 is formed on the insulating layers 508A, 508B, upper and side surfaces of the insulating layers 506A and 506B, and on the second reproducing element 505.

In this structure, since each magnetic thin film thickness on the reproducing element side can be increased, the electrical resistance can be reduced and a greater detection current can be made to flow to each reproducing element.

FIGS. 7 to 15 are cross-sectional views illustrating a manufacturing method for the reproducing head shown in FIG. 6. A detailed description will be given of a procedure of manufacturing the reproducing head shown in FIG. 6, referring to FIGS. 7 to 15.

Figure 7:
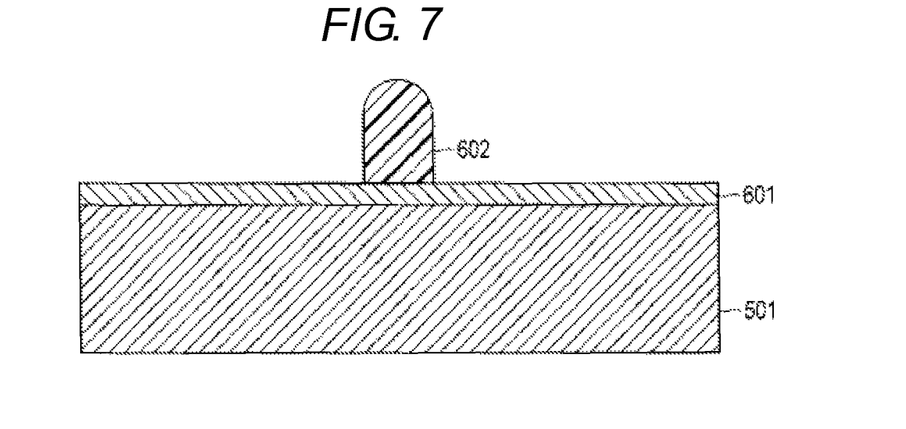
FIG. 7 is a sectional view illustrating a manufacturing step of the reproducing head employed in the embodiment.
Figure 8:
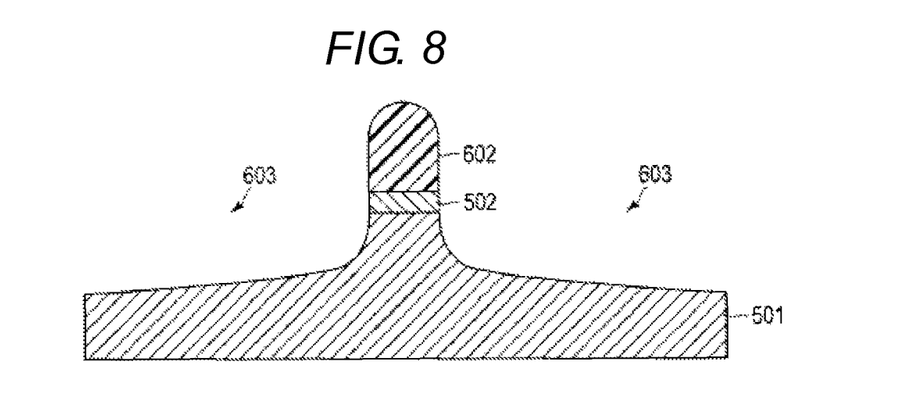
FIG. 8 is a sectional view illustrating a manufacturing step of the reproducing head employed in the embodiment.

Firstly, as shown in FIG. 7, a first reproducing element film 601 is formed on the first magnetic shield 501. On the first reproducing element film 601, a first mask material 602, such as a resist, is formed for processing the first reproducing element to a predetermined size. Subsequently, as shown in FIG. 8, the unnecessary portions of the first reproducing element film 601 that are not located just below the first mask material 602 are etched by, for example, milling, thereby forming the first reproducing element 502. At the time of etching, a recess 603 is formed in the first magnetic shield 501 by digging through the first magnetic shield 501.

Figure 9:
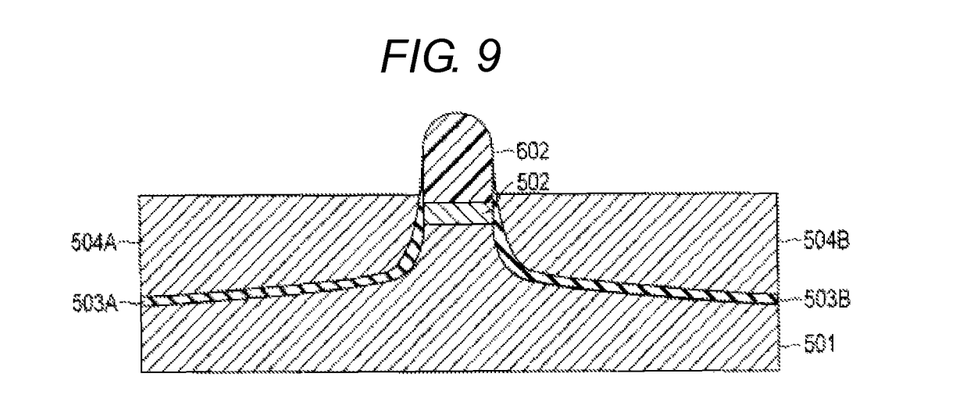
FIG. 9 is a sectional view illustrating a manufacturing step of the reproducing head employed in the embodiment.
Figure 10:
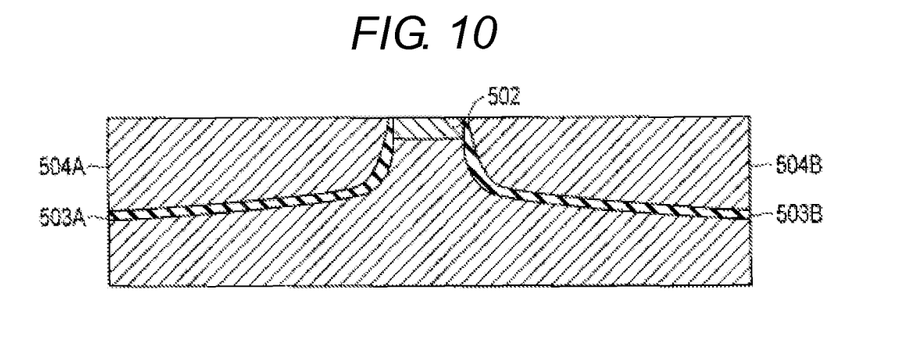
FIG. 10 is a sectional view illustrating a manufacturing step of the reproducing head employed in the embodiment.
Figure 11:
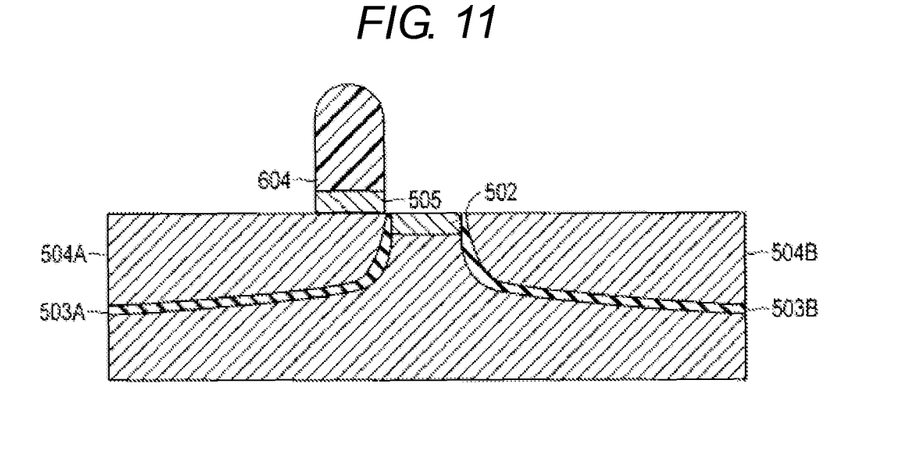
FIG. 11 is a sectional view illustrating a manufacturing step of the reproducing head employed in the embodiment.
Figure 12:
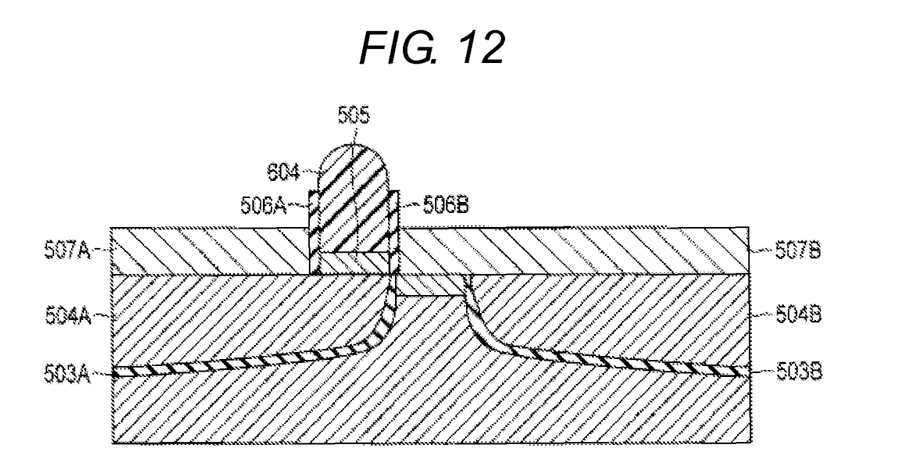
FIG. 12 is a sectional view illustrating a manufacturing step of the reproducing head employed in the embodiment.
Figure 13:
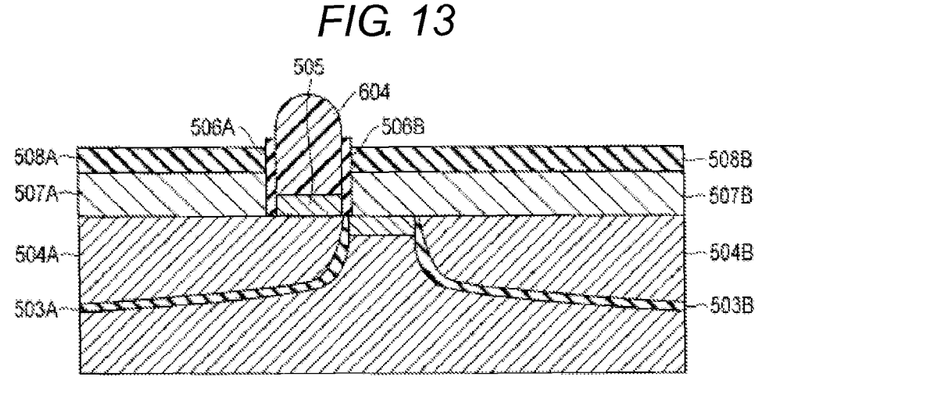
FIG. 13 is a sectional view illustrating a manufacturing step of the reproducing head employed in the embodiment.
Figure 14:
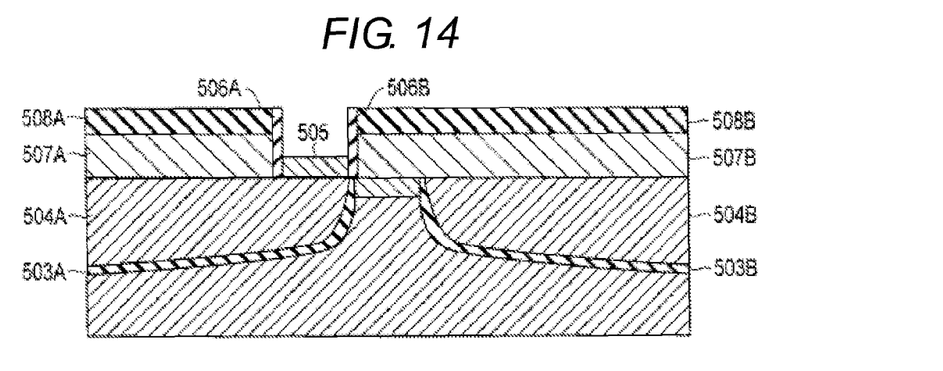
FIG. 14 is a sectional view illustrating a manufacturing step of the reproducing head employed in the embodiment.
Figure 15:
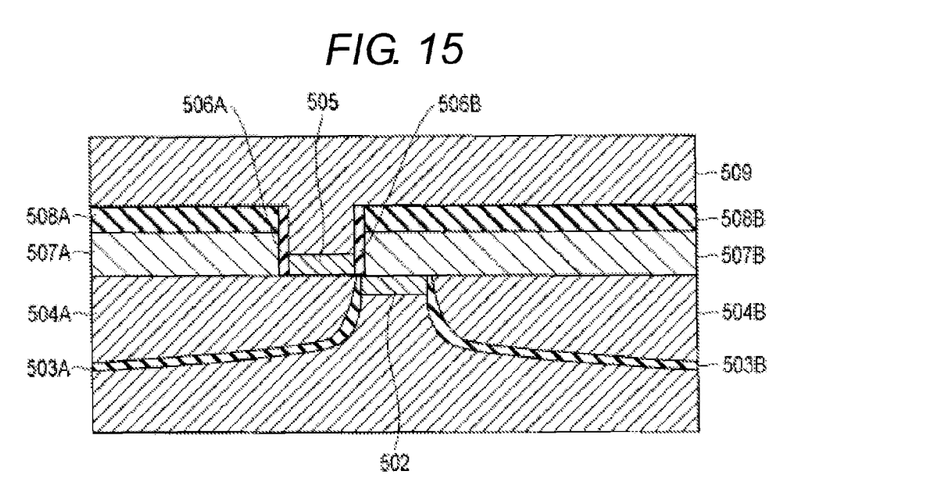
FIG. 15 is a sectional view illustrating a manufacturing step of the reproducing head employed in the embodiment.

As shown in FIG. 9, the insulating layers 503A and 503B, and the magnetic thin films 504A and 504B, which will serve as shields or bias layers, are deposited in this order in the recess 603. As shown in FIG. 10, after removing the first mask material 602, the surface portions of the insulating layer 503 and the magnetic thin films 504A and 504B are removed by a flattening technique, such as chemical mechanical polishing (CMP), thereby flattening the surfaces of the insulating layers 503A and 503B, the magnetic thin films 504A and 504B and the first reproducing element 502. A reproducing element film, which will be formed into the second reproducing element 505, is then formed on the flattened surfaces. As shown in FIG. 11, a second mask material 604 is formed for forming a second reproducing element on a portion of the reproducing element film at a position that is offset from the first reproducing element, and then the unnecessary portions of the second reproducing element film that are not located just below the second mask material 604 are etched, thereby forming the second reproducing element 505. As shown in FIG. 12, in a state where the second mask material 604 is left on the second reproducing element 505, insulating films 506A and 506B are deposited on the side surfaces of the second reproducing element 505 and the second mask material 604, and then the magnetic thin films 507A and 507B that will serve as shields or bias layers are formed on the flattened surfaces. The magnetic thin film 504A is electrically connected to the third magnetic thin film 507A, and the magnetic thin film 504B is electrically connected to the magnetic thin film 507B. As shown in FIG. 13, insulating films 508A and 508B are formed on the magnetic thin films 507A and 507B, respectively, by oxidizing the uppermost surface portions of the magnetic thin films 507A and 507B, or by depositing an insulator on the magnetic thin films 507A and 507B. As shown in FIG. 14, after the second mask material 604 is removed, the surface of the resultant structure is flattened. As shown in FIG. 15, a second magnetic shield 509 is deposited on the entire surface. As a result, the structure shown in FIG. 6 is formed.

If each reproducing element is a spin valve type tunnel magneto-resistance (TMR) element or a CPP-GMR element, it is preferable to combine each magnetic thin film with a soft or hard bias film magnetized in one direction. Alternatively, as this reproducing element, an reproducing element of a tri-layer structure including two free layers, as shown in FIG. 5, may be used. In this case, it is preferable to combine each magnetic thin film with a shield film of a soft magnetic material.

The embodiment comprises the first magnetic thin film 341 formed on the first sidewall of the first reproducing element 311 with the first sidewall insulating film 321 interposed therebetween; the second magnetic thin film 342 formed on the second sidewall of the first reproducing element 311 opposing the first sidewall, with the second sidewall insulating film 322 interposed therebetween; the second reproducing element 312 formed on the first magnetic thin film 341 and electrically isolated from the first reproducing element 311; the third magnetic thin film 343 formed on the first magnetic thin film 341; and the fourth magnetic thin film 344 formed on the first reproducing element 311 and electrically isolated from the second reproducing element 312.

By virtue of this structure, the distance between the first and second reproducing elements 311 and 312 can be shortened, which prevents the inter-track interference of a reproduction signal from significantly varying between different radial positions on a disk at which data is reproduced.

While a certain embodiment has been described, the embodiment has been presented by way of example only, and is not intended to limit the scope of the invention. Indeed, the novel embodiment described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the invention.

What is claimed is:

1. A magnetic head comprising:
a first reproducing element;
a first magnetic film formed on a first side wall of the first reproducing element with a first side wall insulating film interposed therebetween;
a second magnetic film formed on a second side wall of the first reproducing element with a second side wall insulating film interposed therebetween;
a second reproducing element electrically isolated from the first reproducing element and formed on the first magnetic film;
a third magnetic film formed on the first magnetic film;
a fourth magnetic film formed on the first reproducing element and electrically isolated from the second reproducing element;
wherein each of the first and second reproducing elements comprises a stacked structure of a first magnetization free layer, a non-magnetic metal layer, and a second magnetization free layer magnetically coupled to the first magnetization free layer, and also comprises a magnetized bias film provided behind the stacked structure with respect to an opposing surface of a medium from which the magnetic head is to acquire reproduction signals; and
the first, second, third and fourth magnetic films are formed of a soft magnetic material.

2. The magnetic head of claim 1, wherein the fourth magnetic film is formed also on the second magnetic film.

3. The magnetic head of claim 2, wherein the third magnetic film is formed on a first side wall of the second reproducing element with a third side wall insulating film interposed therebetween, and the fourth magnetic film is formed on a second side wall of the second reproducing element with a fourth side wall insulating film interposed therebetween.

4. The magnetic head of claim 1, further comprising a first magnetic shield electrically connected to the first reproducing element and a second magnetic shield electrically connected to the second reproducing element.

5. The magnetic head of claim 4, wherein the first magnetic shield is electrically isolated from the first and second magnetic films and the second magnetic shield is electrically isolated from the third and fourth magnetic films.

6. The magnetic head of claim 1, wherein
the first and second reproducing elements are spin valve type tunnel magneto-resistance elements;
the first, second, third and fourth magnetic films are bias films; and
the first, second, third and fourth magnetic films are magnetized.

7. The magnetic head of claim 1, further comprising:
a third reproducing element formed on the third magnetic film and electrically isolated from the second reproducing element;
a fifth magnetic film formed on the third magnetic film; and
a sixth magnetic film formed on the second reproducing element and electrically isolated from the third reproducing element.

8. The magnetic head of claim 7, wherein
the first, second and third reproducing elements are spin valve type tunnel magneto-resistance elements;
the first, second, third, fourth, fifth and sixth films are bias films; and
the first, second, third, fourth, fifth and sixth films are magnetized.

9. A magnetic head comprising:
a first reproducing element;
a first magnetic film formed on a first side wall of the first reproducing element with a first side wall insulating film interposed therebetween;
a second magnetic film formed on a second side wall of the first reproducing element with a second side wall insulating film interposed therebetween;
a second reproducing element electrically isolated from the first reproducing element and formed on the first magnetic film;
a third magnetic film formed on the first magnetic film;
a fourth magnetic film formed on the first reproducing element and electrically isolated from the second reproducing element;
a third reproducing element formed on the third magnetic film and electrically isolated from the second reproducing element;
a fifth magnetic film formed on the third magnetic film;
a sixth magnetic film formed on the second reproducing element and electrically isolated from the third reproducing element;
wherein
each of the first, second and third reproducing elements comprises a stacked structure of a first magnetization free layer, a non-magnetic metal layer, and a second magnetization free layer magnetically coupled to the first magnetization free layer, and also comprises a magnetized bias film provided behind the stacked structure with respect to an opposing surface of a medium from which the magnetic head is to acquire reproduction signals; and
the first, second, third, fourth, fifth and sixth films are formed of a soft magnetic material.

* * * * *